(12) United States Patent
Kikuchi et al.

(10) Patent No.: US 7,516,823 B2
(45) Date of Patent: Apr. 14, 2009

(54) ELECTRIC BRAKING APPARATUS

(75) Inventors: Kenji Kikuchi, Hitachinaka (JP); Yuichi Kuramochi, Hitachinaka (JP); Yuichi Mabuchi, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/017,927

(22) Filed: Jan. 22, 2008

(65) Prior Publication Data

US 2008/0236964 A1 Oct. 2, 2008

(30) Foreign Application Priority Data

Mar. 28, 2007 (JP) ............................. 2007-083249

(51) Int. Cl.
*B60T 13/74* (2006.01)
(52) U.S. Cl. ...................................... 188/158
(58) Field of Classification Search ......... 188/156–164; 303/20, 152; 701/70; 180/65.1–65.2; 318/52, 318/139
See application file for complete search history.

(56) References Cited

U.S. PATENT DOCUMENTS

| | | | | |
|---|---|---|---|---|
| 3,235,036 | A * | 2/1966 | Meyer et al. | 188/181 R |
| 3,720,863 | A * | 3/1973 | Ringland et al. | 318/52 |
| 4,223,255 | A * | 9/1980 | Goldman et al. | 318/400.41 |
| 4,272,707 | A * | 6/1981 | Burgener et al. | 318/139 |
| 4,429,241 | A | 1/1984 | Ohara et al. | |
| 5,838,877 | A | 11/1998 | Elliot et al. | |
| 6,008,560 | A | 12/1999 | Becerra | |
| 6,810,316 | B2 | 10/2004 | Yokoyama et al. | |
| 6,854,813 | B2 * | 2/2005 | Yokoyama et al. | 303/122.04 |
| 2004/0124697 | A1 * | 7/2004 | MacGregor et al. | 303/89 |
| 2007/0199775 | A1 * | 8/2007 | Yasukawa | 188/73.1 |
| 2007/0247001 | A1 * | 10/2007 | Nakano | 303/157 |
| 2008/0061525 | A1 * | 3/2008 | Ward et al. | 280/93.508 |
| 2008/0091326 | A1 * | 4/2008 | Watanabe et al. | 701/70 |

FOREIGN PATENT DOCUMENTS

| | | |
|---|---|---|
| DE | 2921815 A1 | 1/1980 |
| EP | 1308321 A1 | 5/2003 |
| GB | 2393862 A | 4/2004 |
| JP | 2003-137081 A | 5/2003 |

OTHER PUBLICATIONS

European search report dated Jul. 7, 2008.

* cited by examiner

*Primary Examiner*—Christopher P Schwartz
(74) *Attorney, Agent, or Firm*—Crowell & Moring LLP

(57) ABSTRACT

An electric braking apparatus including a motor for pressing brake pads on disks, a metal housing for housing the motor, a positive-polarity power line for transmitting power from a battery to the electric motor, a negative-polarity ground line for connecting the electric motor to the ground of a vehicle, and a conductor for electrically connecting the metal housing to the negative polarity of battery or the negative-polarity of an inverter.

8 Claims, 13 Drawing Sheets

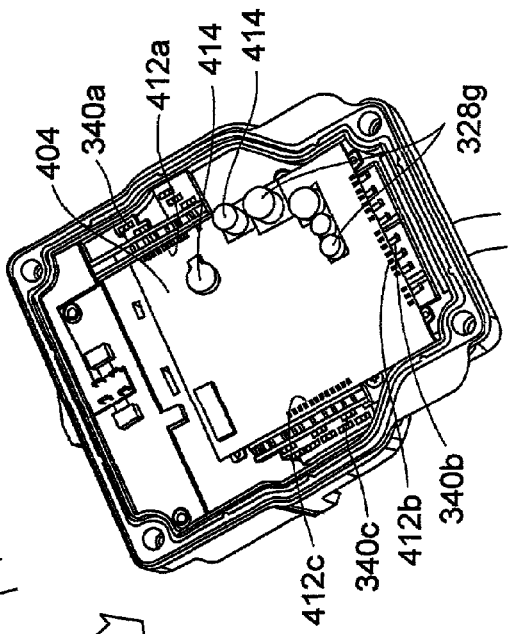
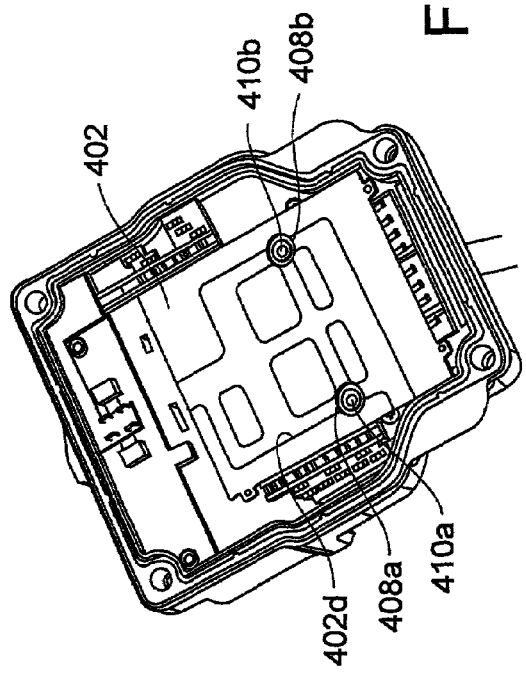
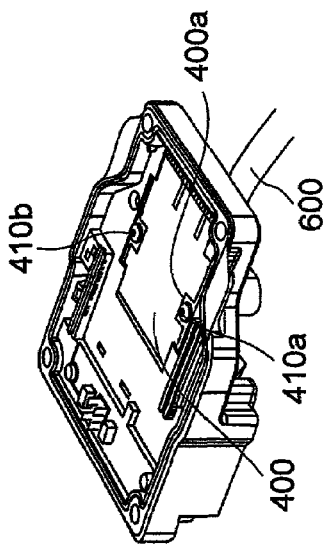
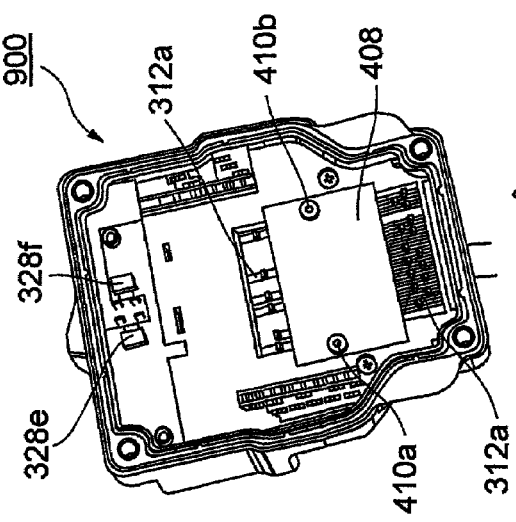

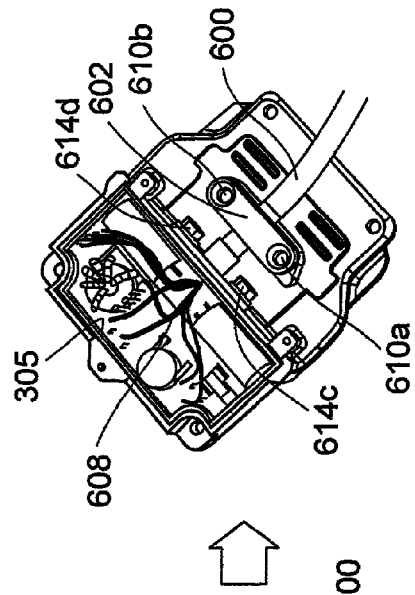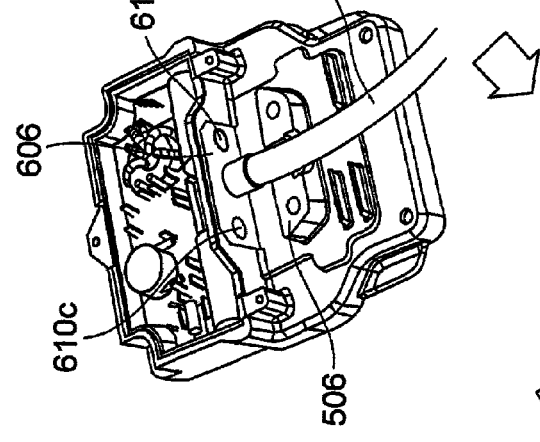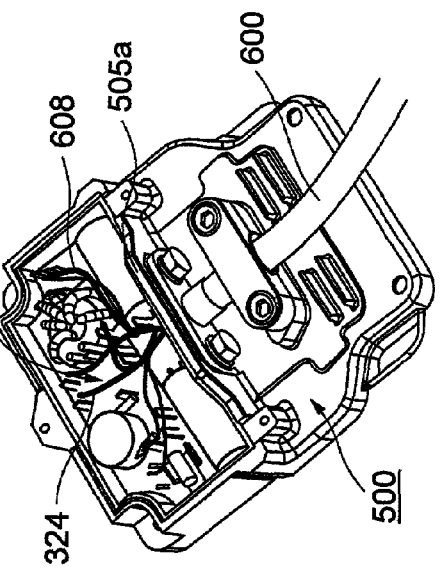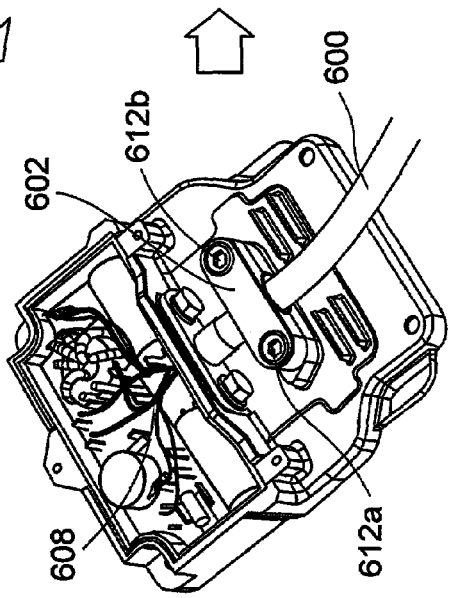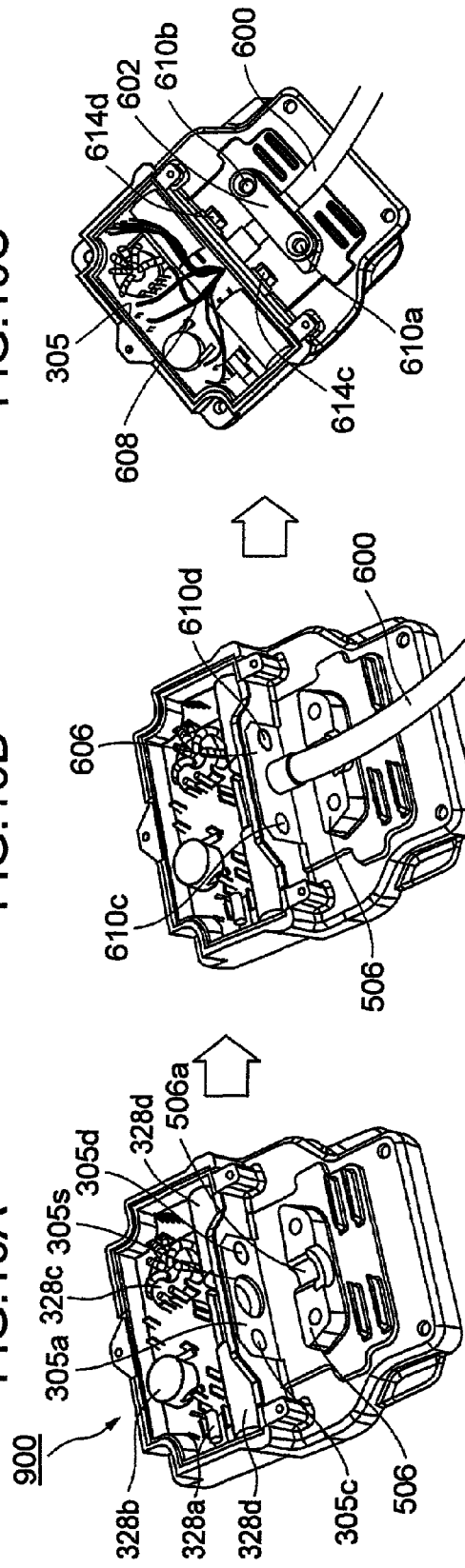

ELECTRIC BRAKING APPARATUS

BACKGROUND OF THE INVENTION

The present invention relates to an electric braking apparatus applicable to an automobile and the like.

Recently, in a brake applicable to an automobile or the like, a contrivance for not only assisting mere driver's braking operation but also, with the aim of improving safety, generating a braking force necessary to avoid collision irrespective of the driver's braking operation and automatically stabilizing the vehicle behavior has been considered in various ways.

It has hitherto been known that in order to automatically generate the braking force as above or to materialize delicate requests made by the driver, an electric motor is controlled in accordance with a traveling status and an environmental status by using an electric braking apparatus having, for example, the electric motor, a reduction gear for reducing the rotation of the electric motor, a rotation/linear motion conversion mechanism for converting the rotation decelerated by the reduction gear into a linear motion of a piston, and brake pads for applying a pushing force against a disk rotor mounted to the piston and rotating along with a wheel (for example, JP-A-2003-137081 corresponding to U.S. Pat. No. 6,810,316).

SUMMARY OF THE INVENTION

In this type of electric braking apparatus, the motor and a drive circuit for driving the motor radiate noise. Depending on the intensity of the noise, units and devices mounted on the vehicle are possibly caused to operate erroneously. In addition, the radiated noise conceivably has such an influence upon a communication apparatus as to be responsible for the cause of reducing sound quality of a received voice and for bringing about a degradation in picture quality of images and videos.

With the background as above, the radiation noise level permissible for electrical equipments inclusive of the electric braking apparatus carried on a vehicle is prescribed pursuant to the international standards and the standards established uniquely by automobile makers as well. Accordingly, in mounting the electric braking apparatus to a vehicle, the radiation noise level is required to be suppressed to below levels stipulated by these standards.

Conversely, there is a possibility that other devices mounted on the vehicle radiate noise to the electric brake.

An object of the present invention is to reduce the influence of the noise concerned in the electric braking apparatus.

An electric braking apparatus according to the present invention comprises a metal housing for accommodating an electric motor adapted to generate a braking force, and a first electric conductor for electrically connecting the electric motor to a negative-polarity power supply line which connects the electric motor to the ground of a vehicle.

The influence of the noise involved in association with electric braking apparatus can be reduced.

Other objects, features and advantages of the invention will become apparent from the following description of the embodiments of the invention taken in conjunction with the accompanying drawings.

BRIEF DESCRIPTION OF THE DRAWINGS

FIGS. 8A-8D show diagrams useful to explain steps of attaching a power module 408, a metal plate 402 and a control circuit substrate 404 to the inner case 300 in FIG. 5.

FIGS. 10A-10E show diagrams useful to explain steps of attaching the harness 600 to an electronic parts mount substrate 900 explained in connection with FIGS. 8A-8D.

DESCRIPTION OF THE EMBODIMENTS

Figure 2:
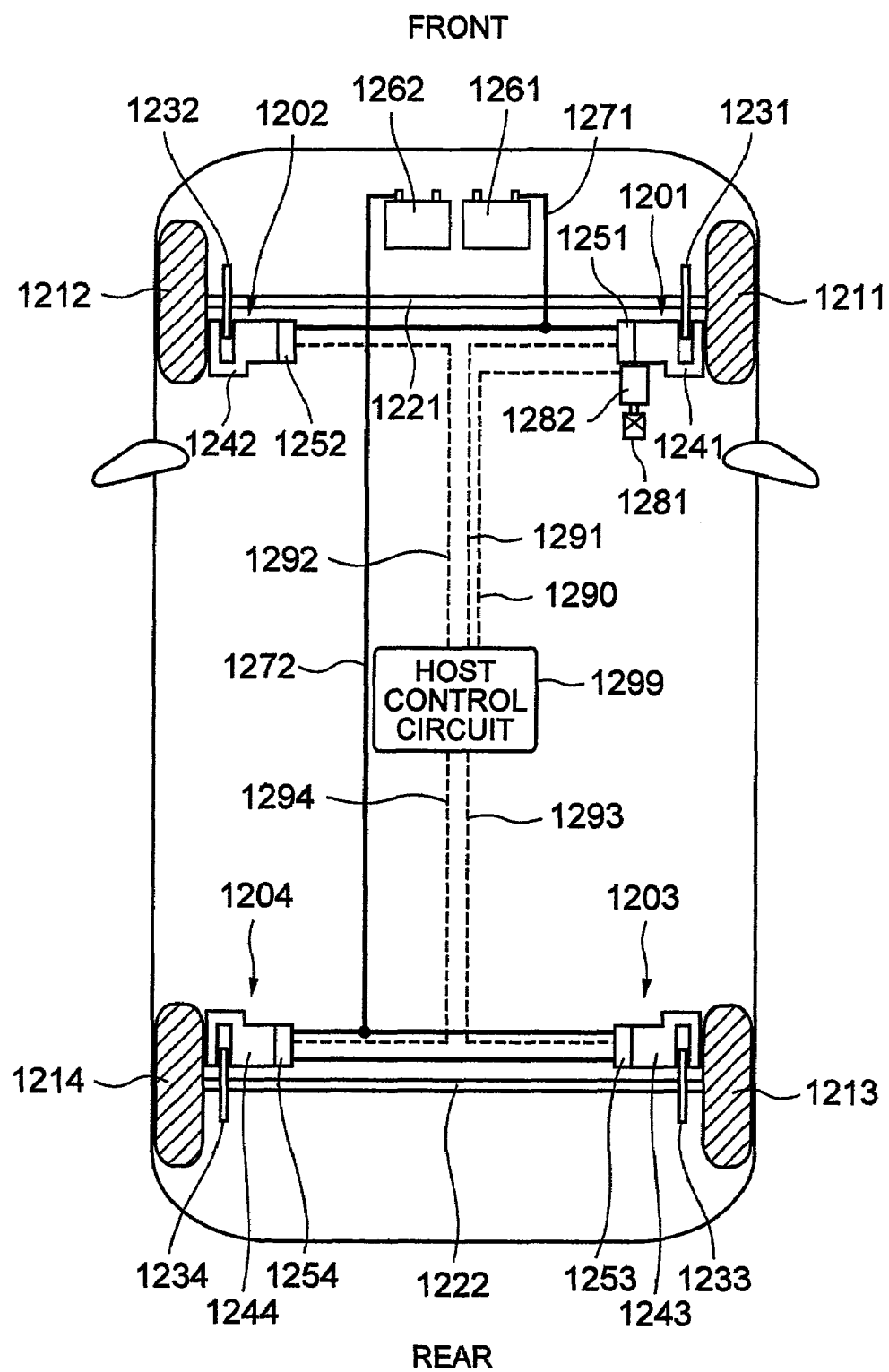
FIG. 2 is a schematic diagram of a brake system of a vehicle mounting the electric braking apparatus.

FIG. 2 is a schematic diagram of a braking system of a vehicle mounting an electric braking apparatus. Description of a drive mechanism for traveling is omitted here.

A first electric braking device 1201 is mounted at a location near a right front wheel 1211 and an axel 1221. A second electric braking device 1202 is mounted at a location near a left front wheel 1212 and the axel 1221. A third electric braking device 1203 is mounted at a location near a right rear wheel 1213 and an axel 1222. A fourth electric braking device 1204 is mounted at a location near a left rear wheel 1214 and the axel 1222.

While the basic structure of the electric braking devices 1201 to 1204 is the same, it is preferable that the first and second electric braking devices 1201 and 1202 in association with the front wheels generate a larger braking force than the third and fourth electric braking devices 1203 and 1204 in association with the rear wheels.

Disk rotors 1231 and 1232 are fixed to the axle 1221 of the front wheels, while disk rotors 1233 and 1234 are fixed to the axle 1222 of the rear wheels. Mechanical units 1241 to 1244 of the electric braking devices are each provided with a pair of brake pads, not shown in FIG. 2, respectively confronting opposite surfaces of each of the disk rotors 1231 to 1234. Electric motors each provided for the mechanical units 1241 to 1244 generate rotational torque and each pair of the brake pads are pressed on each of the disk rotors 1231 to 1234 to sandwich each disk rotor on the basis of the rotational torque, thus generating a braking force.

Each of the electric braking devices 1201 to 1204 is a one-piece construction in which each of electric circuit units 1251 to 1254 that controls the current for driving each electric motor is fixed to each of the mechanical units 1241 to 1244. Specifically, the electric circuit units 1251 to 1254 are attached to the surfaces of mechanical units 1241 to 1244 which are opposite to the brake pads in the axle direction.

Power is supplied to the first electric braking device 1201 and second electric braking device 1202 of the front wheels from a first battery 1261 via a first power source line 1271. Power is supplied to the third electric braking device 1203 and fourth electric braking device 1204 of the rear wheels from a second battery 1262 via a second power source line 1272.

Alternatively, power may be supplied to the first electric braking device 1201 of the right front wheel and fourth electric braking device 1204 of the left rear wheel from the first battery 1261, and power may be supplied to the second electric braking device 1202 of the left front wheel and third electric braking device 1203 of the right rear wheel from the second battery 1262. Since two channels of power source lines are provided, even if one of them experiences a failure, the other line can apply brake, thus improving safety.

In the vehicle braking system as shown in FIG. 2, information concerning a stroke or pedal depression force of a brake pedal 1281 is detected by a pedal operation amount detector 1282 and inputted to a control circuit 1299 via a data signal line 1290. The control circuit 1299 is disposed in, for example, a vehicle cabin and operates in the braking system to apply higher level control processing to the electric circuit units of individual electric braking devices (hereinafter referred to as a "host control circuit").

The host control circuit 1299 receives information on the state of the first to fourth electric braking devices 1201 to 1204 from the first to fourth braking devices 1201 to 1204 via data signal lines 1291 to 1294, respectively. For example, the information on the state of the first to fourth electric braking devices 1201 to 1204 includes: a pressing force value at present, an operation mode value at present and the like. Further, while monitoring the state of the electric motors, the control circuit transmits a control signal responsive to the information about a stroke or pedal depression force of the brake pedal 1281 to the respective electric braking devices 1201 to 1204 via the respective data signal lines 1291 to 1294 so as to control the individual electric braking devices 1201 to 1204.

As described above, the electric braking device acquires as an electric signal a brake command to be generated and can control the braking force in accordance with a change in the signal. The electric signal can be realized in any types of analog signal and communicated signal.

The host control circuit 1299 may control the electric braking devices 1201 to 1204 independently of one another or may perform group control of them by controlling the first and second electric braking devices 1201 and 1202 of the front wheels in one group and the third and fourth braking devices 1203 and 1204 in another group or controlling the first electric braking device 1201 of the front wheel and the fourth electric braking device 1204 of the rear wheel in one group and the second electric braking device 1202 of the front wheel and the third electric braking device 1203 of the rear wheel in another group. The group control has an advantage that control response capability can be improved, the load imposed on processing of the control circuit can be reduced and the fail-safe process function can be promoted.

The vehicle electric braking devices 1201 to 1204 constructed as above are attached directly to a car frame without intervention of, for example, suspension, so that they are used under such an environment condition that their vulnerability to the influence of vibration is prevalent and migration of water to the interior is likely during traveling in rain.

The electric braking devices 1201 to 1204 in the present embodiment include the mechanical units 1241 to 1244 which are integral with the electric circuit units 1251 to 1254 having control circuits and many semiconductor devices are provided for each of the control circuits. Since the semiconductor device has such a nature that its characteristics change under the influence of heat, transfer of frictional heat at high temperatures generated by the brake pads being present in mechanical units 1241 to 1244 to press the disk rotors 1231 to 1232 rotating together with the wheels needs to be suppressed as far as possible and besides heat generated by the semiconductor device per se needs to be dissipated efficiently.

Figure 3:
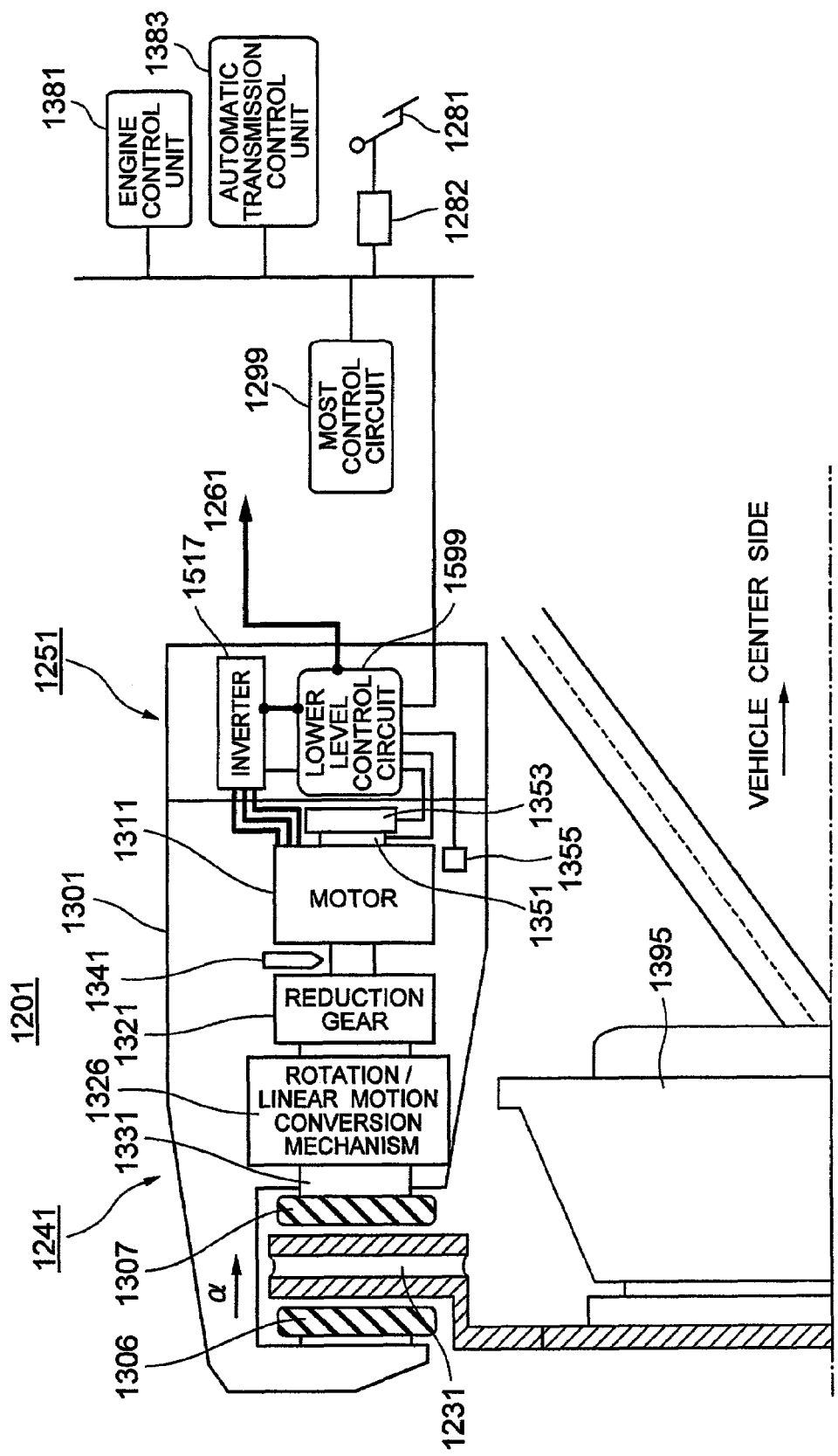
FIG. 3 is a conceptual diagram of the electric braking apparatus in FIG. 2.

FIG. 3 is a conceptual diagram of one of the braking devices in FIG. 2. Here, the first electric braking device 1201 will be described as a representative of such electric braking devices.

The electric braking device 1201 comprises a pair of brake pads 1306 and 1307 which are disposed to face each other. Part of the disk rotor 1231 rotating with the rotation of the axle is interposed between the respective brake pads 1306 and 1307.

In the electric braking device 1201, the mechanical unit 1241 is integral with the electric circuit unit 1251.

Speaking of domains of the mechanical unit 1241 and the electric circuit unit 1251, they are merely put together or conglomerated and therefore they can be separable structurally.

The mechanical unit 1241 comprises, for example, an electric motor 1311 as a three-phase motor; a reduction gear 1321 for decelerating the rotation of the electric motor 1311; and a rotation/linear motion conversion mechanism 1326 for converting the rotational motion of the electric motor 1311, which is decelerated by the reduction gear 1311, into a linear motion to advance and retract a piston 1331, which are all housed in a housing 1301.

The brake pad 1307 is attached to the piston 1331 and pressed on one side of the disk rotor 1231 by the thrust force of piston 1331. In this event, the electric braking unit 1201 is moved in a direction of arrow α in the figure by dint of a reaction force attributable to the pressing force applied on the one side of disk rotor 1231, causing the brake pad 1306 to press the disk rotor 1231 from the other surface side.

The mechanical unit 1241 comprises a parking brake (PKB) mechanism 1341. When the rotation of the electric motor 1311 is stopped while the thrust force being applied to the piston 1331 to the disk rotor 1231, it is possible for the parking brake mechanism 1341 to maintain braking force without supplying power to the electric motor 1311.

A rotational angle detection sensor 1351 for detecting a rotation angle of the electric motor 1311, a thrust sensor 1353 for detecting a thrust force generated by driving the electric motor 1311 and a motor temperature sensor 1355 for detecting the temperature of the electric motor 1311 are provided in the vicinity of the electric motor 1311. The output signals of the rotational angle detection sensor 1351, thrust sensor 1353 and motor temperature sensor 1355 are delivered to a lower level control circuit 1599 which is disposed in the electric circuit unit 1251.

Power is supplied to the electric circuit unit 1251 from the battery 1261 disposed on the side of the car frame. The electric circuit unit also acquires various kinds of control signals via a CAN (Control Area Network) coupled with an engine control unit 1381, an automatic transmission (AT) control unit 1383 and the pedal operating amount detector 1282 and the like, or from the LAN via the host control circuit 1299.

The electric circuit unit 1251 is provided with an inverter circuit 1517 and the lower level control unit 1599. The inverter 1517 is a circuit for controlling voltage to be applied to the electric motor 1311. The lower level control circuit 1599 acquires control signals via the CAN and besides output information signals of the rotational angle detection sensor 1351, thrust sensor 1353, motor temperature sensor 1355 and the like from the mechanical unit 1241 and controls the inverter circuit 1517 on the basis of these signals.

The electric motor then acquires the output from the inverter circuit 1517 to generate rotational torque which in turn causes the piston 1331 to generate a predetermined thrust force. In the figure, reference numeral 1395 designates a structure on the vehicle side.

Figure 4:
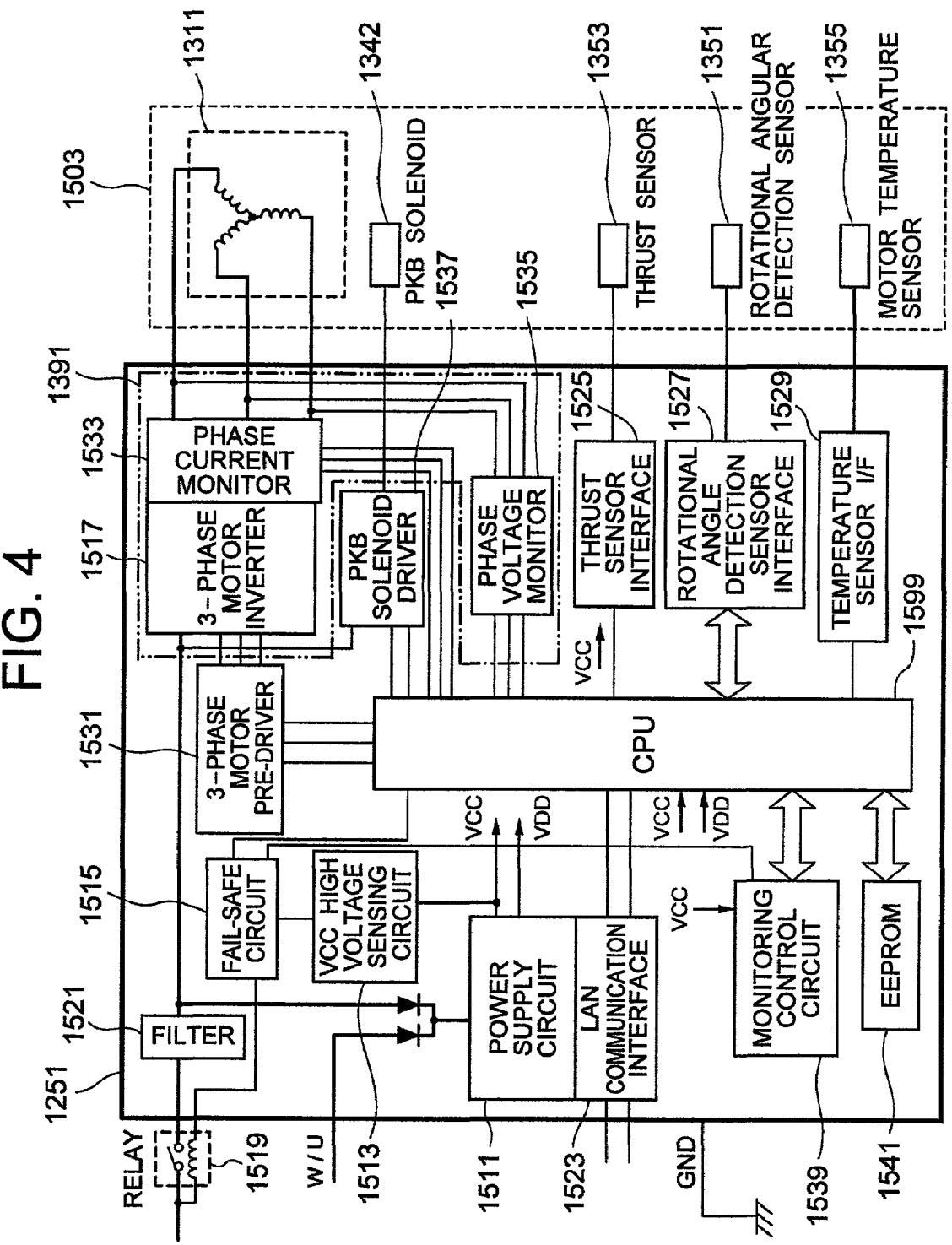
FIG. 4 is a circuit configuration diagram of an electric circuit unit 1251 in FIG. 3.

FIG. 4 is a circuit configuration diagram of the electric circuit unit 1251 in FIG. 3.

Circuits of the electric circuit unit 1251 are illustrated as being involved in a thick line frame in the figure and of them, a circuit encircled by a chained-line frame 1391 is the inverter circuit 1517. Circuits of the mechanical unit 1241 are shown by a dotted line frame 1503.

Although not illustrated, the circuits inside the mechanical unit 1241 and the electric circuit unit 1251 which are shown in FIG. 4 are housed by metal housings and they can therefore be protected from causes of external damage such as flying stones. Further, by using a metal housing of high heat conduction, dissipation of heat generated from the individual circuits can be achieved. In addition, by using a metal housing of high shielding capability, the shield effect for electromagnetic wave can be obtained.

The dotted line frame 1503 also corresponds to a metal housing adapted to protect the internal components from causes of external damage such as flying stones and having the shield effect for noise generated by the motor and electromagnetic waves. Then, the connection points or surfaces between the metal housing of electric circuit unit and that of mechanical unit are connected together electrically conductively. In this phase, potential difference is measured between ground and each of the metal housings and preferably, the potential difference measured between ground and the metal housing of electric circuit unit equals that measured between ground and the metal housing of mechanical unit. With the potential difference being different, when noise propagates on the metal housing, the noise is reflected at a discontinuous point or plane where the potential difference differs and noise radiates to the outside of the electric braking apparatus from the discontinuous point or plane.

In the circuits of electric circuit unit 1251, power that is supplied via power supply lines within the vehicle is inputted to a power supply circuit 1511. Stable power (Vcc, Vdd) provided by the power supply circuit 1511 is supplied to a central processing unit (CPU) representing the lower level control circuit 1599. The power (Vcc) from the power supply circuit 1511 is detected by a VCC high voltage sensing circuit 1513, and if the VCC high voltage sensing circuit 1513 detects a high voltage, then a fail safe circuit 1515 goes into action.

The failsafe circuit 1515 actuates a relay 1519 for switching the power that is supplied to the three-phase motor inverter 1517 as will be described later. With the high voltage detected by the VCC high voltage sensing circuit 1513, the power supply is turned off.

A filter circuit 1521 eliminates noise from the power supplied to the electric circuit unit 1251 via the relay 1519 and supplies the power removed of noise to the three-phase motor inverter 1517.

The central processing unit (CPU) 1599 acquires a control signal from the host control circuit 1299 via the CAN communication interface circuit 1523 and also acquires output signals from the thrust sensor 1353, rotational angle detection sensor 1351 and motor temperature sensor 1355 via thrust sensor interface circuit 1525, rotational angle detection sensor interface circuit 1527 and motor temperature sensor interface circuit 1529, respectively. By acquiring information concerning a status of the electric motor 1311 at present and performing feedback control on the basis of the control signal from the host control circuit 1299, the electric motor 1311 can be caused to generate suitable rotational torque. Namely, on the basis of the control signal from the host control circuit 1599 and detection values of the individual sensors, the central processing unit 1599 outputs proper signals to a three-phase motor pre-driver 1531.

The three-phase motor inverter 1517 is provided with a phase current monitor circuit 1533 and a phase voltage monitor circuit 1535. The phase current monitor circuit 1533 and phase voltage monitor circuit 1535 operate to monitor phase current and phase voltage, respectively, and to output the monitor results to the central processing unit 1599. In accordance with the monitor results, the central processing unit 1599 operates the three-phase motor pre-driver circuit 1531 properly.

Since the three-phase motor inverter 1517 controls current and voltage for driving the electric motor 1311, it incorporates a semiconductor device of relatively high output. Accordingly, high temperature heat is generated through operation of the semiconductor device and countermeasures thereagainst will be taken with a structure to be detailed later.

The central processing unit 1599 also controls a PKB (parking brake) solenoid 1342 inside the mechanical unit 1241 via a parking brake (hereinafter, PKB) solenoid driver circuit 1537 on the basis of the control signal from the host control circuit 1299 and values detected by the individual sensors, thereby actuating the parking brake. It should be noted that the same power as that supplied to the three-phase motor inverter 1517 is supplied to the PKB solenoid driver circuit 1537.

Furthermore, the electric circuit unit 1251 is provided with a monitoring control circuit 1539 for transmitting and receiving signals to and from the central processing unit 1599, and a storage circuit 1541 comprised of an EEPROM in which failure information, for example, is stored.

The electric circuit unit 1251 is connected to the mechanical unit 1241 through a large number of lines but it is connected to other circuits than those of the mechanical unit 1241 (battery 1261 and host control circuit 1299) through lines extremely reduced in number. Therefore, in a production process of the electric braking device 1201 having an integral structure of the mechanical unit 1241 and the electric circuit unit 1251, complicated connections between the mechanical unit 1241 and the electric circuit unit 1251 are first set up in order that when the electric braking device 1201 is attached to the car frame after completion of the electric braking device 1201, connections to the battery 1261 or to the host control circuit 1299 can be accomplished very easily.

Next, a specific hardware construction will be detailed with reference to FIGS. 5 to 11.

Figure 5:
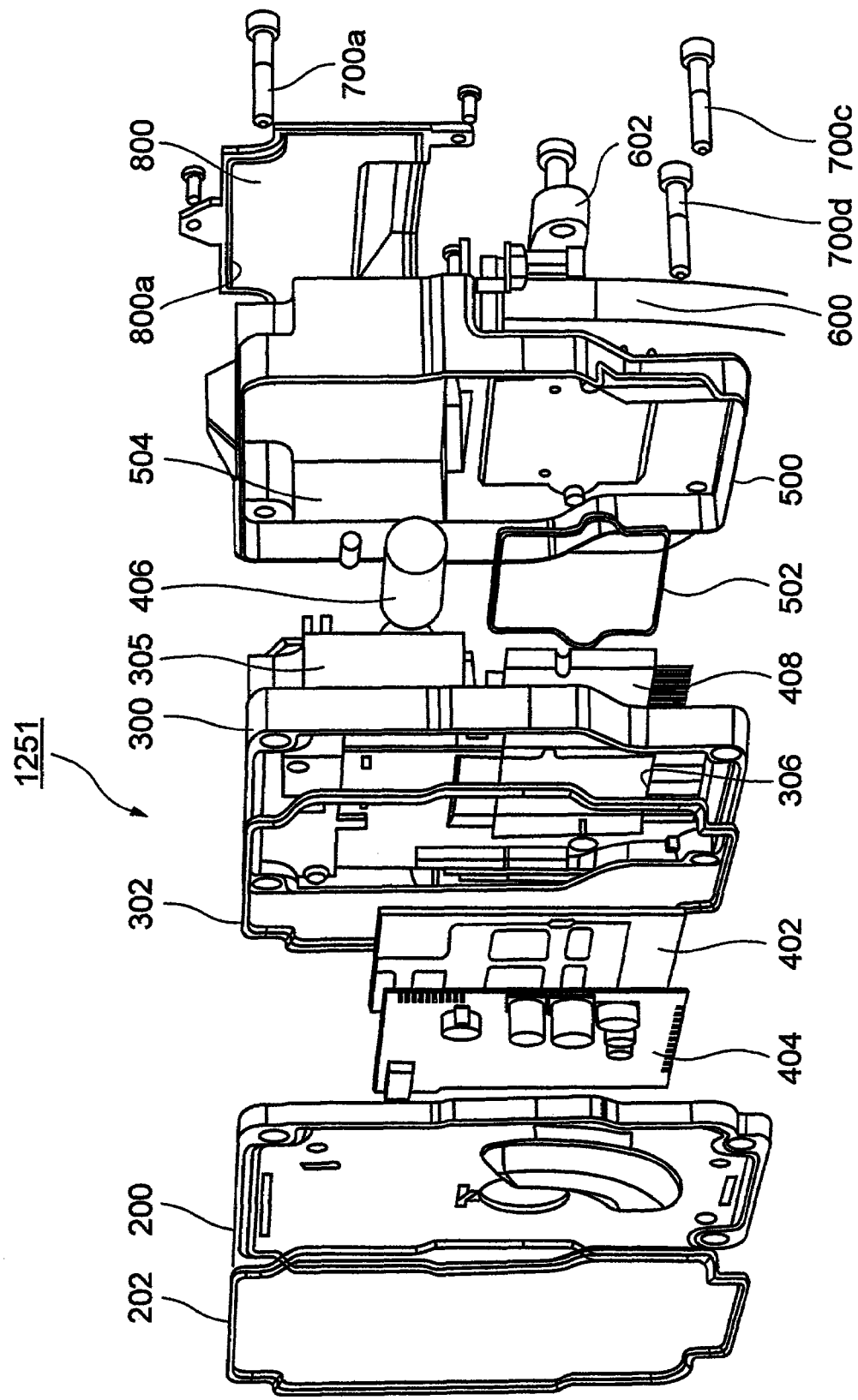
FIG. 5 is an exploded perspective view of individual constituent members of the FIG. 3 electric circuit unit 1251.

FIG. 5 is an exploded perspective view illustrating individual constituent members of the electric circuit unit 1251 in FIG. 3.

Figure 13:
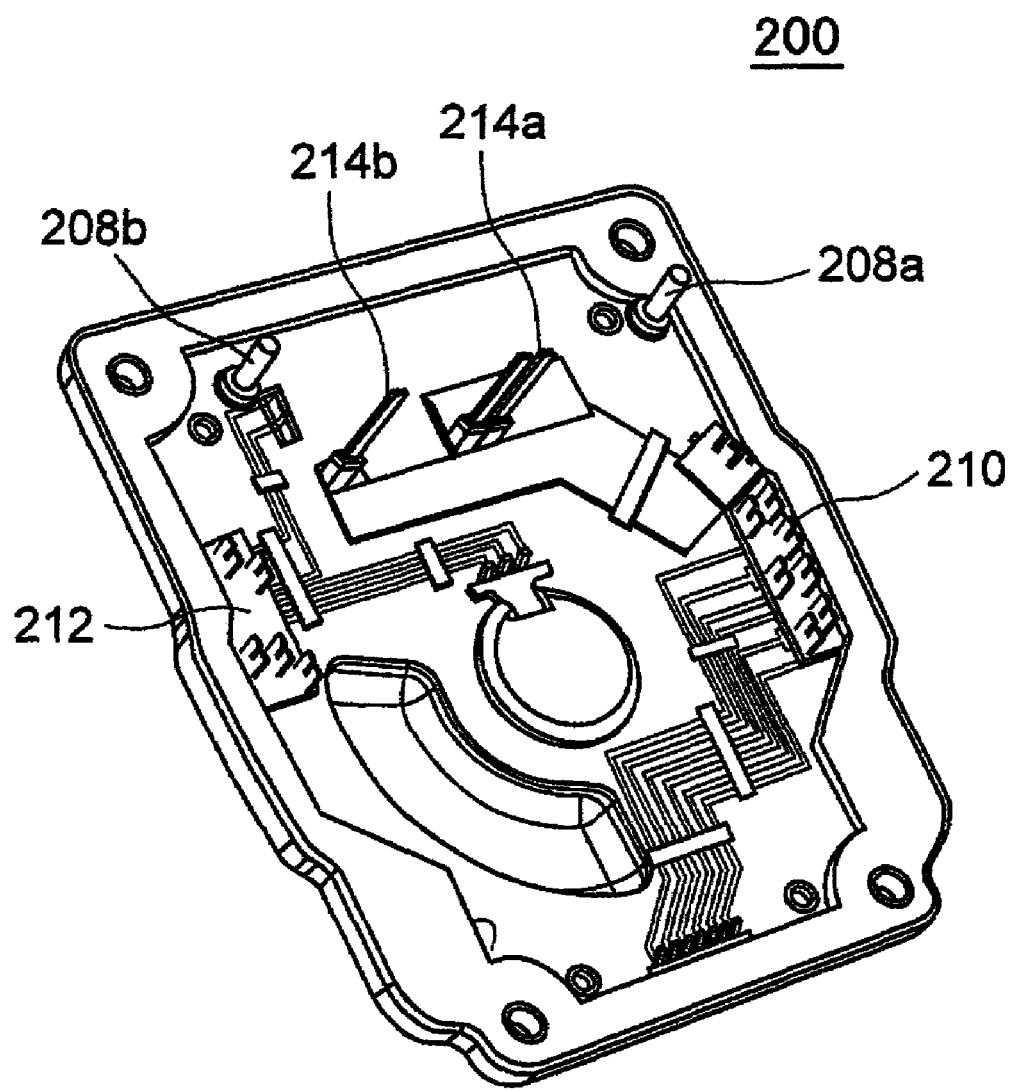
FIG. 13 is a perspective view of I/F module 200 shown in FIG. 5.

An I/F module 200 is a wiring substrate attached to the housing of the mechanical unit 1241 and having the relay function to electrically connect terminals (not shown) arranged on the side of mechanical unit 1241 to terminals of the electric circuit unit 1251. Since the I/F module 200 is made of a material of synthetic resin, heat transfer from the brake pads can be minimized. FIG. 13 shows a perspective view of the I/F module 200 in detail. Projecting members 208a and 208b, bifurcate terminals 210 and 212, and terminals 214a and 214b are formed on the I/F module 200 for connections with the inner case 300.

The I/F module 200 additionally has an opening through which the terminals arranged on the side of mechanical unit 1241 can pass. The opening functions as a communication hole for unifying internal spaces of the electric circuit unit 1251 and mechanical unit 1241 through the medium of the I/F module 200.

A seal 202 is disposed peripherally of the surface of I/F module 200 close to the mechanical unit 1241 to surround a central portion of the I/F module 200. Since the I/F module 200 is attached to the housing of mechanical unit 1241 via the seal 202, intrusion of water or foreign materials through a clearance (space) between the mechanical unit 1241 and the I/F module 200 can be prevented.

An inner case 300 is attached to the I/F module 200. Since the inner case 300 is also made of a material of synthetic resin, heat transfer from the brake pads can be minimized. Further, the inner case 300 is attached to the I/F module 200 through a seal 302 and therefore, intrusion of water or foreign materials through a clearance between the inner case 300 and the I/F module 200 can be prevented.

The inner case 300 functions as a substrate for mounting electronic parts to be described later. On the surface of inner case 300 confronting the I/F module 200, metal plate 402 made of aluminum and control circuit substrate 404 are mounted sequentially. The aluminum metal plate 402 can avoid the control circuit substrate 404 from being damaged by torsion.

The surface of inner case 300 confronting the I/F module 200 is recessed at a portion excepting the periphery inclusive of the seal 302. The metal plate 402 and control circuit substrate 404 are arranged in the recess (not shown).

A wall portion 305 is formed on the surface of inner case 300 opposite to the I/F module 200 so as to surround one of divisional areas obtained by halving the opposite surface area. In an area internal of the wall portion 305, relatively large electronic parts 406, for example, a capacitor or reactor is mounted (hereinafter referred to as an electronic parts mount area). In the other divisional area, a relatively large perforated hole 306 is formed partly of the area. Arranged in the perforated hole 306 is a power module 408.

The three-phase motor inverter circuit 1517, phase-current monitor circuit 1533 and phase-voltage monitor circuit 1535 which are shown in FIG. 4 are molded to the power module 408.

Further, on the surface of inner case 300 opposite to the I/F module 200, an outer case 500 is attached. The outer case 500 has an opening 504. Through the opening 504, an electronic parts mount area 316 (see FIG. 7B) of inner case 300 can be viewed from the outside with eyes to promote workability. Further, the outer case 500 is so attached as to cover the peripheral surface of inner case 300, the peripheral surface of wall portion 305, the perforated hole 306 and its peripheral edge. The outer case 500 is made of metal, for example, from aluminum alloy having its outer surface alumite-treated and it covers the major portion of the outer peripheral surface of electric circuit unit 1251 to protect the internal circuits from external shocks.

On the surface of outer case 500 confronting the inner case 300, a seal 502 is disposed at a portion surrounding the perforated hole 306 and corresponding to its peripheral edge to encircle the perforated hole 306. The seal 502 prevents water from migrating to the surface of inner case 300 confronting the I/F module 200 from the opening 504 via the perforated hole 306.

A harness 600 for supplying power or control signals from the outside of the electric braking apparatus is fixed to the outer case 500 by means of a harness stopper 602. Individual wiring conductors (not shown) inside the harness 600 are led to the electronic parts mount area 316 inside the wall portion 305 through perforated holes (not shown) formed in the wall portion 305 of inner case 300.

The I/F module 200, inner case 300 and outer case 500 have each screw holes formed at four corners and they are made to be integral and attached to the mechanical unit 1241 by inserting bolts 700a, 700b (not shown), 700c and 700d through the corner holes from the outer case 500.

A cover 800 is screwed to the outer case 500 so as to cover the opening 504 of outer case 500. The cover 800 is made of a metal material, for example, aluminum alloy.

Figure 6A:
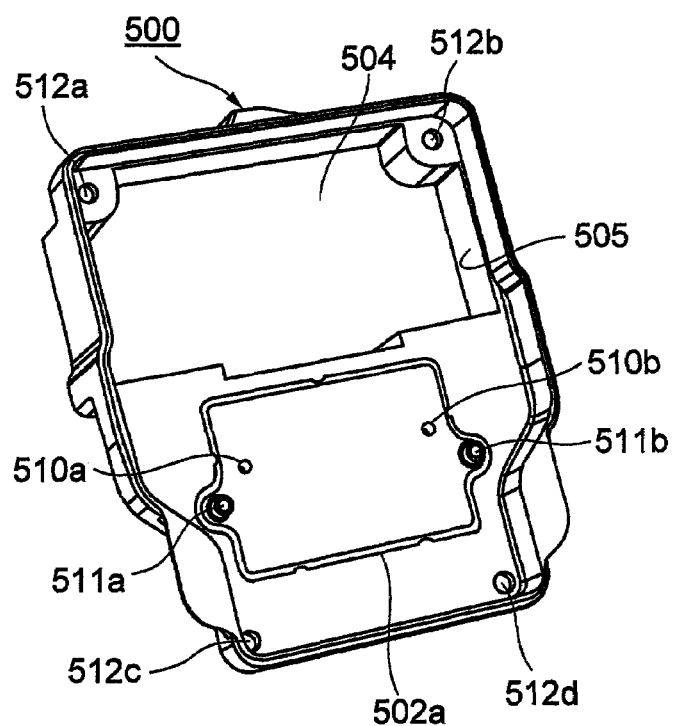
FIGS. 6A and 6B are diagrams showing detailed construction of an outer case 500 in FIG. 5.
Figure 6B:
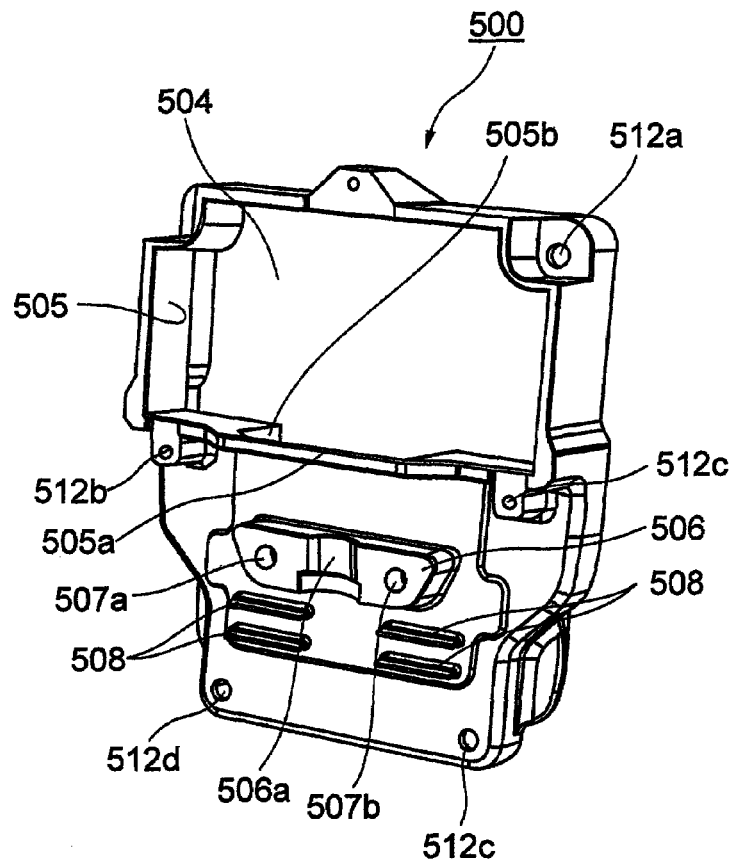

The outer case 500 is constructed as detailed in FIGS. 6A and 6B. Particularly, FIG. 6A illustrates in perspective view form the outer case 500 as viewed from a surface (inner surface) opposing the inner case 300 and FIG. 6B illustrates it also in perspective view form as viewed from a surface (outer surface) disposed oppositely to the surface confronting the inner case 300.

The outer case 500 has a contour form substantially similar to that of the inner case 300. The outer case 500 has large diameter holes 512a, 512b, 512c and 512d formed at its four corners, respectively. The previously described bolts 700a, 700b, 700c and 700d are inserted to the large-diameter holes to fix the electric circuit unit 1251 to the mechanical unit 1241.

A substantially rectangular groove 502a is formed in the inner surface of outer case 500 as shown in FIG. 6A at a portion excepting the opening 504. The aforementioned seal 502 (not shown) is embedded in the groove 502a, though not illustrated.

In an area surrounded by the groove 502a, there are formed screw holes 510a and 510b for fixing the power module 408 as will be described later.

Screw holes 511a and 511b are so formed as to be close to the aforementioned screw holes 510a and 510b, respectively. With a view to positioning the screw holes 511a and 511b within the area encircled by the groove 502a, the groove 502a is so formed as to go around the portions of the screw holes 511a and 511b. The screw holes 511a and 511b are disposed coaxially with screw holes 310a and 310b to be described later with reference to FIGS. 7A and 7B. Further, by using screws 320a and 320b to be described later with reference to FIG. 8, the outer case 500 is fixed to the inner case 300.

Projecting members 508 as shown in FIG. 6B are formed on the outer surface of outer case 500. They are effective to increase the surface area of outer case 500 coming in touch with the open air and therefore the heat dissipation effect can be increased.

A wall portion 505 is formed externally of the wall portion 305 of inner case 300 by abutting on the wall portion 305, providing an outer frame of electronic parts mount area 316 together with the wall portion 305 of inner case 300. Thanks to this, the mechanical strength of the outer frame of electronic parts mount area 316 can be ameliorated.

A bridge 505a having opposite ends connected to the wall portion 505 is formed in association therewith. In the bridge 505a, an opening 505b is formed. When the outer case 500 and the inner case 300 are put together, a projecting wall portion 305a of inner case 300 to be described later with reference to FIG. 7B is fitted in the opening 505b, so that the bridge 505a encircles the peripheral side surface of the projection wall 305a.

Screw holes 512a and 512b for screwing the cover 800 adapted to put a lid on the opening 504 are formed in part of the periphery of wall portion 505.

As shown in FIG. 6B, a harness fixture 506 for fixing the harness 600 as will be described later is provided on the outer surface of outer case 500. In the center of the projecting base, a groove 506a oriented to the opening 504 is formed. The harness fixture 506 clamps and fixes the harness 600 in cooperation with a harness stopper 602 to be described later. At opposite ends of harness fixture 506 standing face to face with intervention of the groove 506a, screw holes 507a and 507b for fixing the harness stopper 602 are formed.

Figure 7A:
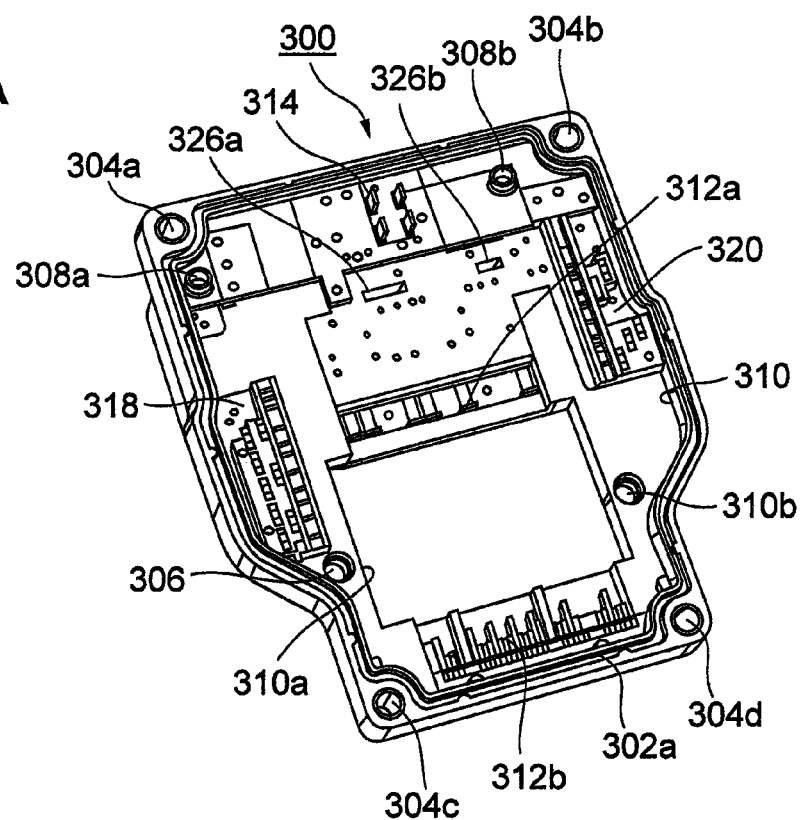
FIGS. 7A and 7B are diagrams showing detailed construction of an inner case 300 in FIG. 5.
Figure 7B:
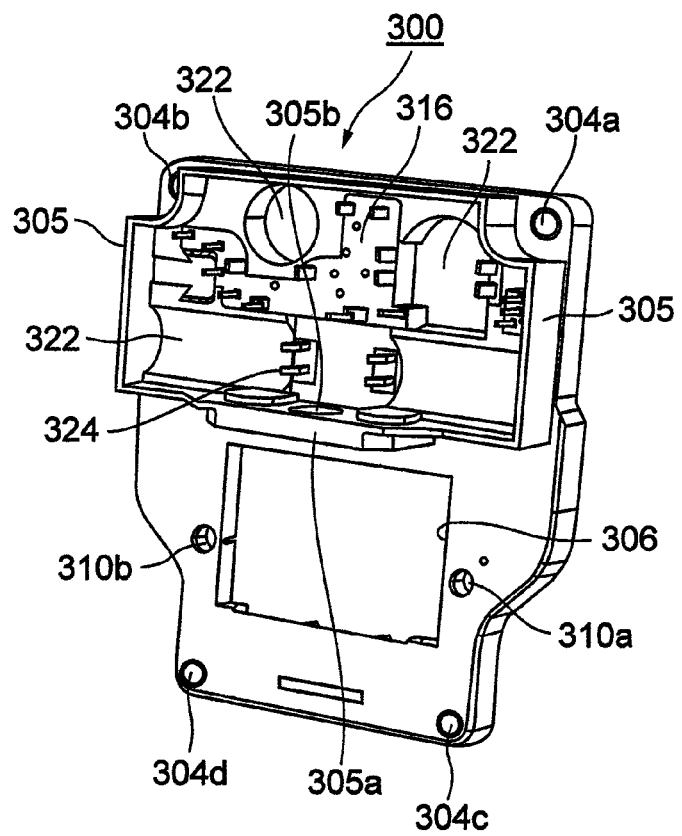

FIGS. 7A and 7B illustrate the construction of the inner case 300 in FIG. 5. In particular, FIG. 7A illustrates in perspective view form the inner case 300 as viewed from a surface (inner surface) disposed to oppose the I/F module 200 and FIG. 7B illustrates it also in perspective view form as viewed from a surface (outer surface) opposite to the inner surface, also indicating wiring conductors embedded internally.

The inner case 300 functions as the substrate for mounting the electronic parts to be described later. The inner case 300 is made of synthetic resin having the ability to suppress transfer of heat from the mechanical unit 1241.

As will be seen from FIG. 7A, the inner case 300 has a contour form substantially similar to that of the I/F module 200 shown in FIG. 13. The inner case 300 has large diameter holes 304a, 304b, 304c and 304d formed at its four corners, respectively. The bolts 700a, 700b, 700c and 700d are inserted to the large-diameter holes 304a, 304b, 304c and 304d to fix the electric circuit unit 1251 including the inner case 300 to the mechanical unit 1241. Projecting members 208a and 208b formed in the I/F module 200 are inserted to the holes 308a and 308b, respectively.

A relatively large rectangular perforated hole 306 is formed at a position slightly clear off the center of inner case 300. A power module 408 to be described later is disposed in the perforated hole 306.

Terminals 312a and 312b are juxtaposed at two sides in the opposite side relation of the periphery of the perforated hole 306 and are connected by welding to electrodes (terminals) projecting from the power module 408. A terminal 314 is formed on the rear side of the electronic parts mount area 316. Small-sized electronic parts are disposed near the terminal 314, having their electrodes connected thereto.

In the periphery of the perforated hole 306, perforated holes 310a and 310b are formed near two sides in opposite side relation excepting the sides at which the terminals 312a and 312b are juxtaposed. The perforated holes 310a and 310b function as screw holes when fixing the inner case 300 and power module 408 to the outer case 500.

When the inner case 300 is disposed at a fixed position while opposing the I/F module 200, bifurcate terminals 210 formed in the I/F module 200 are inserted to terminal holes 318, respectively, and bifurcate terminals 212 are inserted to terminal holes 320, respectively. The terminal holes incorporate terminals abutting on the forks of each of the bifurcate terminals 210 and 212.

As shown in FIG. 7B, the aforementioned perforated hole 306 and electronic parts mount area 316 are arranged in the outer side surface of the inner case 300. The electronic parts mount area 316 is so formed as to be surrounded by the wall portion 305. Recesses 322 formed in the electronic parts mount area 316 carry electronic parts such as capacitors and have each a shape commensurate with that of the electronic parts such as capacitors. Near the recesses 322, terminals 324 are studded. The terminal 324 is connected to the electrodes of the aforementioned electronic parts. This ensures that the individual electronic parts can be located at fixed positions and can be connected electrically without error to a wiring layer embedded in the inner case. The wiring layer embedded in the inner case 300 includes a wiring layer of relatively small width wiring for transmission and reception of signals (communication system bus) and a wiring layer of relatively large width wiring for being supplied with power of high voltage (power system bus).

Between the periphery of inner case 300 formed with large-diameter holes 304a, 304b, 304c and 304d and a portion of central part slightly inwardly clear off from the periphery, a step 310 is formed to provide a recess in the center. A control circuit substrate 404 to be described later is arranged in the recess and an air layer is formed to intervene between the inner case 300 and the I/F module 200. By virtue of the air layer, heat transfer from the mechanical unit 1241 to the electronic parts can be suppressed.

A groove 302a is so formed as to be disposed inwardly of the large diameter holes 304a, 304b, 304c and 304d and also to encircle the central part of the inner case 300. The aforementioned seal 302 (not shown) is fitted in the groove 302a. This is effective to prevent water and foreign matters from migrating to the air layer between the inner case 300 and the I/F module 200.

When the inner case 300 is located at a fixed position while opposing the I/F module 200, the terminals 214a and 214b formed in the I/F module 200 are inserted in the perforated holes 326a and 326b. Then, tip ends of the terminals 214a and 214b project to the outer side of inner case 300 (electronic parts mount area 316) through the perforated holes 326a and 326b.

The perforated holes 326a and 326b are made to be larger than the terminals 214a and 214b to be inserted. Accordingly, air in the electric brake can be convective sufficiently via the perforated holes 326a and 326b. Therefore, a local change in atmospheric pressure inside the electric braking apparatus can be suppressed to restrain a degradation in hermetical sealing function of the seal and the like (atmospheric pressure adjustment function).

The projecting wall 305a formed by thickening the wall portion 305 is provided for a part of wall portion 305 confronting the perforated hole 306. Perforated hole 305b formed in the projecting wall 305a extends from the perforated hole 306 to the electronic parts mount area 316. By fixing a flange 606 mounted to the tip end of the harness 600 to be described later to the thickened projecting wall 305a, the tip end of the harness 600 can be fixed rigidly. Then, individual wiring conductors inside the harness 600 are led to the electronic parts mount area 316 through the perforated hole 305b.

FIGS. 8A-8D show diagrams useful to explain steps of attaching the power module 408, metal plate 402 and control circuit substrate 404 to the inner case 300 in FIG. 5.

Firstly, as shown in FIG. 8A, electronic parts 328e and 328f relatively smaller than the electronic parts 328a to 328d are mounted on the inner surface of an electronic parts mount substrate 900 attached with the harness 600 to be described later. Further, the power module 408 is disposed in the perforated hole 306 formed in the inner surface of the electronic parts mount substrate 900. The power module 408 has screw holes (not shown) and screws 410a and 410b are brought into mesh engagement with the screw holes 510a and 510b (FIG. 6A) formed in the outer case 500 through the medium of these screw holes, thereby fixing the power module 408.

It will be appreciated that before the power module 408 is attached, the perforated hole 306 formed in the rear surface of the inner case 300 and functioning as a recess for accommodating the power module 408 is closed by the outer case 500. In this case, the bottom of the recess forms a part of the outer case 500 made of metal and the power module 408 is so disposed as to come in contact with the outer case 500. Therefore, heat generated in the power module 408 can be dissipated through the outer case 500, thus improving the reliability of braking force control. Further, though not illustrated, a heat dissipation grease or a heat sink sheet may intervene between the outer case 500 and the power module 408 to promote the efficiency of heat transfer from the power module 408 to the outer case 500.

The power module 408 also has on its side surface terminals serving as electrodes of the power module 408. With the power module 408 arranged on the inner case 300 at a fixed position, the terminals of power module 408 make contact with the terminals 312*a* and 312*b* of inner case 300. The terminals of power module 408 and those of inner case 300 are electrically connected together by welding, for instance. The terminals of power module 408 and inner case 300 have their fore ends bent through about 90°, and surfaces of the bent fore ends contact with each other. Accordingly, welding work for the inner side surface of inner case 300 can be facilitated and assembling workability can be promoted.

Next, as shown in FIG. 8B, an insulating sheet 400 is arranged on the upper surface (confronting the I/F module 200) of power module 408. This can permit electrical isolation between the individual terminals of power module 400 and a metal plate 402 to be described below. As a material of the insulating sheet 400, polyimide resin, for example, is used which can provide a heat proof nature of 150° or more and a breakdown voltage of 200 kV/mm as well between the individual terminals of power module 408 and the metal plate 402.

To add, the insulating sheet 400 extends up to the terminals of power module 408 to cover them and is bonded to the upper surface of power module 408. The insulating sheet 400 is formed in such a pattern having cuttings 400*a* which escape from the heads of the screws 410*a* and 410*b*, without covering the heads, for fixing the power module 408 to the outer case 500.

Next, as shown in FIG. 8C, the metal plate 402 of aluminum, for instance, is arranged on the upper surface (confronting the I/F module 200) of insulating sheet 400. This ensures that the control circuit substrate 404 disposed on the surface (confronting the I/F module 200) of metal plate 402 can be reinforced mechanically. Further, heat generated in the control circuit substrate 404 can be dissipated efficiently.

The metal plate 402 is sized sufficiently enough to cover the power module 408 and the insulating sheet 400 as well. Perforated holes 408*a* and 408*b* formed in the metal plate 402 permit the heads of the screws 410*a* and 410*b* for fixing the power module 408 to the outer case 500 to expose while preventing their heads from jutting out of the perforated holes 408*a* and 408*b*. Through this, the metal plate 402 can be disposed intimately to the insulating sheet 400 and besides, the control circuit substrate 404 to be described below can be disposed on the upper surface of the metal plate 402 intimately, thereby contributing to the size reduction of the electric braking apparatus.

Furthermore, the metal plate 402 is formed with a patterned recess 402*d* on the surface confronting the control circuit substrate 404 to be described below. On the other hand, the control circuit substrate 404 has sometimes a terminal for inspection check (not shown) which exposes to the surface confronting the metal plate 402. Then, the recess 402*d* is so formed as to permit the terminal for inspection check to confront the formation domain of the recess 402*d* in order for the inspection check terminal to avoid direct contact with the metal plate 402. This prevents individual elements of the inspection check terminal from electrically connecting to the metal plate 402 and makes a contribution to the size reduction of the electric braking apparatus. In addition, when the control circuit substrate 404 is bonded to the upper surface of metal plate 402 by using bonding agent, the recess 402*d* can have the function to escape the bonding agent.

Then, as shown in FIG. 8D, the control circuit substrate 404 is arranged on the top surface (confronting the I/F module 200) of metal plate 402. The control circuit substrate 404 has its substrate formed of, for example, ceramics and has its top surface (opposite to the metal plate 402) mounted with relatively large electronic parts 328*g*. Because of the substrate of control circuit substrate 404 being formed of ceramics, heat-proof and vibration-proof properties of the control circuit substrate can be improved. In addition, due to the fact that the control circuit substrate 404 is arranged on the upper surface of metal plate 402, even in the event that the inner case, for example, is deformed for some causes such as for example an excessive reaction force from the piston 1331, the control circuit substrate 404 can be prevented from being damaged.

Electronic parts 414 are mounted on the control circuit substrate 404 and wiring layers 412*a* to 412*c* are provided on the substrate surface or embedded in the substrate. Terminals 340*a* to 340*c* to be connected to the wiring layers are formed at part of the periphery of control circuit substrate 404 in parallel therewith and corresponding terminals among them, for example, the terminal 340*a* and the terminal 412*a* are connected each other electrically by bonding of wire of, for example, aluminum.

Then, the side of control circuit substrate 404 on which the electronic parts are mounted is coated with a gelled member (not shown). By virtue of the gelled member, the electronic parts 414 of control circuit substrate 404 and the wire bonding can be protected from dusts and dew condensation and besides, transmission of vibration can be mitigated.

Figure 9:
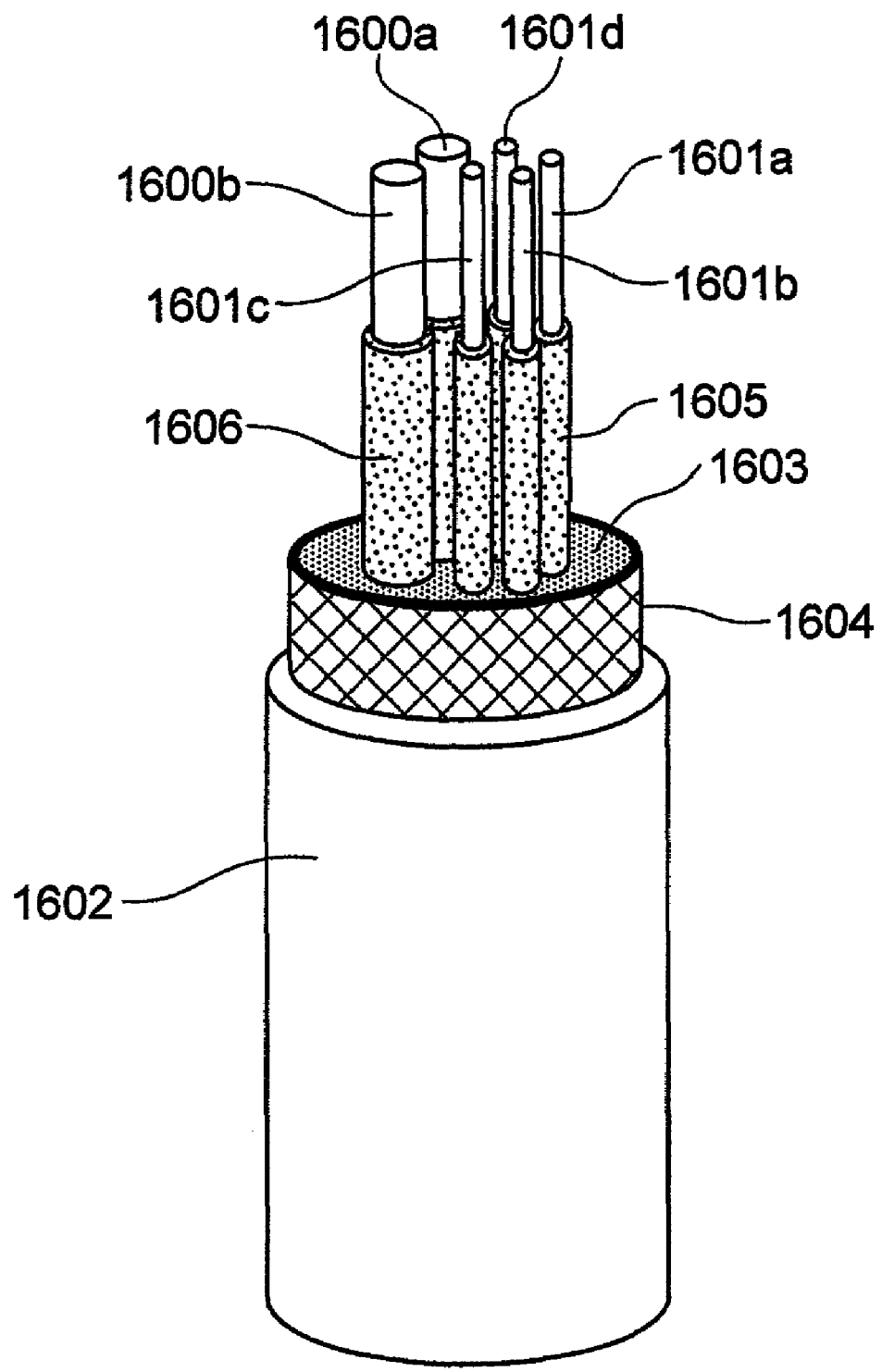
FIG. 9 is a detailed diagram of a harness 600.

FIG. 9 is a detailed diagram of the harness 600.

The power line 1600*a* supplies electric power necessary to actuate the electric actuator carried on the electric braking apparatus. The ground line 1600*b* for grounding the electric braking apparatus is paired with the power line 1600*a*. A power line covering member 1606 covers the power line 1600*a* and ground line 1600*b* to protect the power line 1600*a* from external shocks.

Signal lines 1601*a* to 1601*d* transmit a thrust command signal complying with a step-on amount of brake pedal, a start end command signal for the electric braking apparatus and the like signal.

A communication line covering member 1605 covers communication lines 1601*a* to 1601*d* to protect the communication lines from external shocks. By additionally covering the communication line covering member 1605 with a shield member, radiation of radio noise from the communication lines 1601*a* to 1601*d* may be reduced. An air communicable member 1603 can pass air therethrough. When the difference in atmospheric pressure between portions of air communicative member 1603 exposing to the opposite ends of the harness 600 increases beyond a predetermined value, air flows from one end of harness 600 at high atmospheric pressure to the other end of harness 600 at low atmospheric pressure. Consequently, the atmospheric pressure difference between the both end spaces connected by the harness 600 can be suppressed to fall within a predetermined range. A material suitable for the air communicable member 1603 is a polymer compound, for example, a plant or a fiber material produced through a scientific process.

A shield member 1604 covers the outer side of the air communicable member 1603 for the sake of preventing noise radiation. The harness 600 connecting the car frame and the electric braking apparatus is used in an environment under springs in which vibrations occur frequently and besides, it is fixed to the car frame, thus being required of stringent flexion capability. By using a sheet-like member produced by knitting thin metal wires for the shield member 1604, the vibration proof and flexion capabilities of the harness 600 can be promoted.

The covering member 1602 covers the outer side of the shield member 1604 to keep the shield member from being damaged and the communication lines and power line from being broken or disconnected. As a material of the covering member 1602, a polymer compound having excellent water proof function and flexion capability as well is used.

FIGS. 10A-10E show diagrams useful to explain the procedures of attaching the harness 600 explained in connection with FIG. 9 to the electronic parts mount substrate 900.

The outer surface of the electronic parts mount substrate 900 is illustrated in FIG. 10A. In the electronic parts mount substrate 900, a ring-shaped seal 305s is provided in the projecting wall 305a formed on the inner case 300 to surround the periphery of the perforated hole 305b.

Illustrated in FIG. 10B is the electronic parts mount substrate 900 on which the harness 600 is arranged at a fixed position. The flange 606 is formed with a perforated hole (not shown) to which the harness 600 is inserted and screw holes 610c and 610d embracing the perforated hole. The perforated hole to which the harness 600 is inserted makes the correspondence with or communicates with the perforated hole 305b formed in the projecting wall 305a and the screw holes 610c and 610d make the correspondence with the screw holes 305c and 305d formed in the projecting wall 305a, having their center axes aligned coaxially.

The harness 600 is disposed in a groove 506a in a harness fixture 506 at a location slightly distant from the end surface of the flange 606. By dint of the groove 506a, movement of the harness 600 in a direction crossing its longitudinal direction can be restricted.

Next, as illustrated in FIG. 8C, the flange 606 of harness 600 is fixed to the projecting wall 305a by means of bolts 614c and 614d. In this phase, the flange 606 of harness 600 is brought into intimate contact to the projecting wall 305a through the seal 305s. Hence, water can be prevented from permeating to the electronic parts mount area 316 internal of the wall portion 305 through the interface between the projecting wall 305a and the flange 606.

As also illustrated in FIG. 10C, the harness stopper 602 is placed above the harness fixture 506 to clamp the harness 600.

The clamping portion of harness stopper 602 is shaped semi-cylindrically, for example, to be congruous with the shape of the harness 600. The harness stopper is formed with screw holes 610a and 610b at opposite ends embracing the harness 600.

Next, as illustrated in FIG. 10D, the harness stopper 602 is fixed to the harness fixture 506 by using bolts 612a and 612b. The bolts 612a and 612b are brought into mesh engagement firstly with the screw holes 610a and 610b in the harness stopper 602 and thereafter with corresponding screw holes in the harness fixture 506 so as to be fixed. Consequently, the harness 600 is sandwiched between the harness fixture 506 and the harness stopper 602, with its movement in the axial direction being restricted by a clamping push force.

The harness 600 attached to the outer case 500 is led out of the apparatus proper to extend firstly or once in a direction vertical to a direction of movement of the electric braking apparatus during braking and thereafter in a free direction. Therefore, in the course of the movement of the electric braking apparatus during braking, the harness 600 can always be dragged with a play. This prevents the harness 600 from being disconnected under a strained condition.

Then, as shown in FIG. 10E, respective wiring lines 608 led out of the harness 600 to the electronic parts mount area 316 are connected to respective elements of terminal 324 by welding, for instance. The individual elements of terminal 324 are connected to wiring layers studded in the inner case 300, projecting to the surface of electronic parts mount area 316.

In place of the flange 606, a connector mountable/dismountable to the electric braking apparatus may be used. In this case, connectors on the side of electronic parts mount substrate 900 may be arranged near the electronic parts mount area 316, for example, an wall portion 305 and they are connected electrically to the electronic parts 328a to 328d inside the electronic parts mount area 316 by electrical conductor lines, for instance. Then, connectors on the side of harness 600 are fitted in the aforementioned connectors on the side of electronic parts mount substrate 900 so as to be connected thereto electrically.

Figure 11:
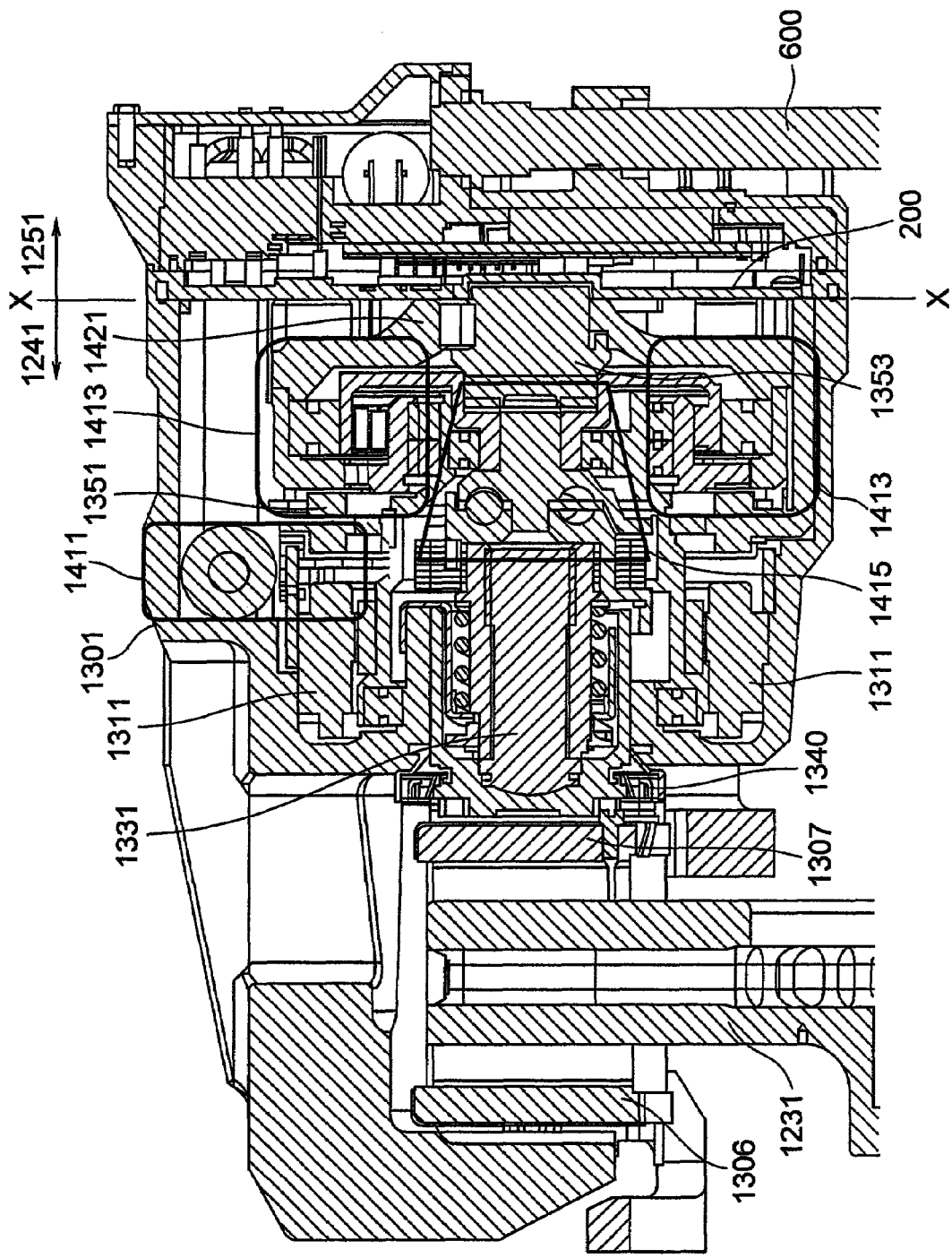
FIG. 11 is a cross-sectional view of a specific internal structure of the electric braking apparatus in FIG. 3.

FIG. 11 is a cross-sectional diagram of a specific internal structure of the electric braking device of FIG. 3.

In FIG. 11, a line segment X-X indicates the boundary between the mechanical unit 1241 and the electric circuit unit 1251, illustrating the mechanical unit 1241 on the left side of the line segment X-X in the figure and the electric circuit unit 1251 on the right side in the figure.

The mechanical unit 1241 and the electric circuit unit 1251 are covered with metal housings, respectively, and the metal housing of electric circuit unit is connected electrically conductively to connection points (planes) of the metal housing of mechanical unit. In this phase, potential difference is measured between ground and each of the metal housings and preferably, the potential difference measured between ground and the metal housing of electric circuit unit equals that measured between ground and the metal housing of mechanical unit. With the potential difference being different, when noise propagates on the metal housing, the noise is reflected at a discontinuous point or plane where the potential difference differs and noise is radiated to the outside of the electric braking apparatus from the discontinuous point or plane.

The parking brake mechanism 1341 shown in FIG. 3 is equal to a structure shown in a thick line frame 1411. The reduction gear 1321 shown in FIG. 3 is equal to a structure in a thick line frame 1413. The rotation/linear motion converter mechanism 1326 shown in FIG. 3 is equal to a structure in a thick line frame 1415. In FIG. 11, parts designated by the same reference numerals as those in FIG. 3 indicate the same members as those shown in FIG. 3.

The electric motor 1311 is structured as, for example, a brushless three-phase motor that comprises a stator fixed to the housing 1301 and a rotor disposed in the stator.

The electric motor 1311 actuates the rotor to rotate by a desired angle with a desired torque according to a command from the host control circuit 1299. A rotational angle of the rotor is detected by means of the rotational angle sensor 1351. The rotational angle sensor 1351 is interposed between the reduction gear 1413 and the electric motor 1311.

The reduction gear 1413 reduces the rotation speed of the electric motor 1311 to thereby increase the torque of the electric motor 1311. This enables the use of a small-sized electric motor 1311.

A thrust plate 1421 within the mechanical unit 1241 is disposed closely to the electric circuit unit 1251 and has the function to receive the thrust force of piston 1331 as a reaction force. The thrust sensor 1353 is disposed in the center of the thrust plate 1421.

Then, the thrust plate 1421 is disposed at a slight depth from the end surface of the housing 1301 of mechanical unit 1241 (in the figure, line X-X portion) toward the brake pad. A clearance (space) is formed between the constituent members of mechanical unit 1241 excepting the housing 1301 and the electric circuit unit 1251. On the other hand, the thrust sensor 1353 slightly protrudes to the electric circuit unit 1251 beyond the end surface (in the figure X-X line portion) of the housing 1301. But the interface module (hereinafter referred to as I/F module) 200 provided for the electric circuit unit 1251 has a recess for avoidance of interference with the thrust sensor 1353.

Most of constituent members of mechanical unit 1241 inclusive of the housing 1301 are metallic members, thus having excellent heat transfer efficiency. Accordingly, heat from the brake pads (brake pads 1306 and 1307 and their neighboring) is liable to be transferred to the neighboring mechanical unit 1241 and then dissipated externally through the housing 1301.

Further, since the electric circuit unit 1251 is formed on a surface opposite to the brake pad portion across the mechanical unit 1241, transfer of heat to the electric circuit unit 1251 can be minimized by far. In addition, a clearance (space) as described above is formed between the constituent members of mechanical unit 1241 and the electric circuit unit 1251, so that heat conduction from the mechanical unit 1241 to the electric circuit unit 1251 can be reduced even more.

Incidentally, the noise the electric braking devices 1201 to 1204 in FIG. 2 radiate increases during braking, that is, motor operation. There is a possibility that depending on its intensity, the thus generated noise causes the equipments mounted on the vehicle carrying the electric braking apparatus to operate erroneously. In addition, in the case of a communication apparatus, the radiated noise is responsible for the cause of reducing sound quality of a received voice and for bringing about a reduction in picture quality of images and videos. With the background as above, the radiation noise level permissible for electric equipments inclusive of the electric braking apparatus mounted on a vehicle is prescribed pursuant to the international standards and the standards established uniquely by automakers. Accordingly, in mounting the electric braking apparatus to a vehicle, the radiation noise level is required to be suppressed to below levels stipulated by these standards.

Accordingly, for countermeasures against the noise, the housing covering the mechanical unit 1241 and the housing covering the electric circuit unit 1251 shown in FIG. 3 are made to be electrically conductive at connecting points or surfaces and are connected to ground via the shield of harness in the electric circuit unit. For an AC component containing noise, a common capacitor is connected between the power source of the electric circuit unit and the ground.

Figure 12:
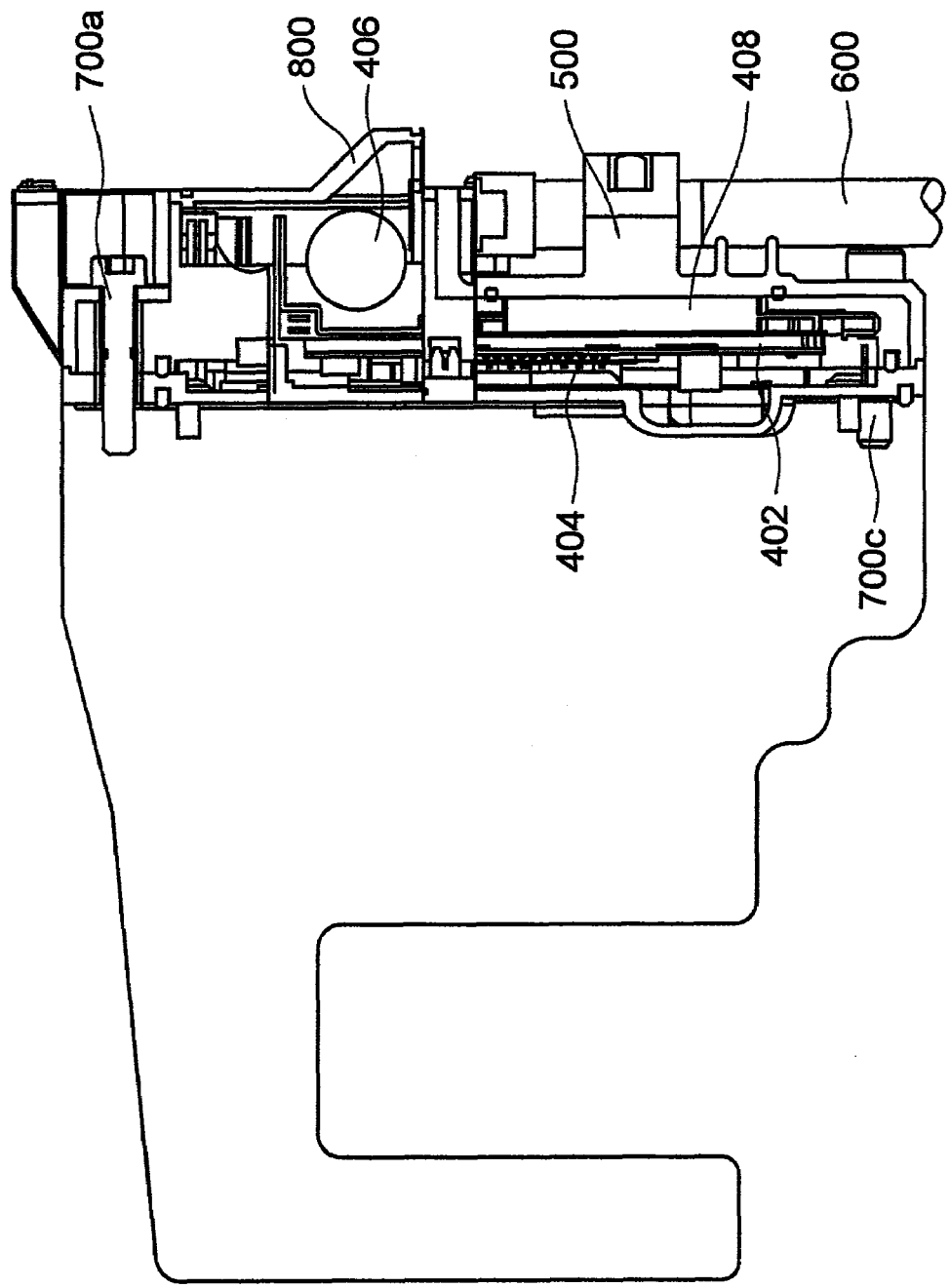
FIG. 12 is a sectional view showing the internal construction of a control unit in FIG. 11.

As has been explained in connection with FIG. 4, the circuits inside mechanical unit 1241 and the electric circuit unit are covered with the metal housings of high shielding capability, thus having the shield effect against electromagnetic wave and the like. Further, the mechanical unit 1241 per se in FIG. 3 is also covered with the metal housing for the purpose of attaining the shield effect against noise, electromagnetic wave and the like and the metal housing of electric circuit unit and that of mechanical unit are connected electrically conductively through their connection points or surfaces. The housing covering the mechanical unit 1241 is connected to the housing covering the electric circuit unit 1251 as shown in FIG. 12 by using, for example, bolts 700a, 700b, 700c and 700d shown in FIG. 5. In this phase, potential difference is measured between ground and each of the metal housings and preferably, the potential difference measured between ground and the metal housing of electric circuit unit equals that measured between ground and the metal housing of mechanical unit. With the potential difference differing, when noise propagate on the metal housing, the noise is reflected at a discontinuous point or plane where the potential difference differs and noise is radiated to the outside of the electric braking apparatus from the discontinuous point or plane.

Figure 1:
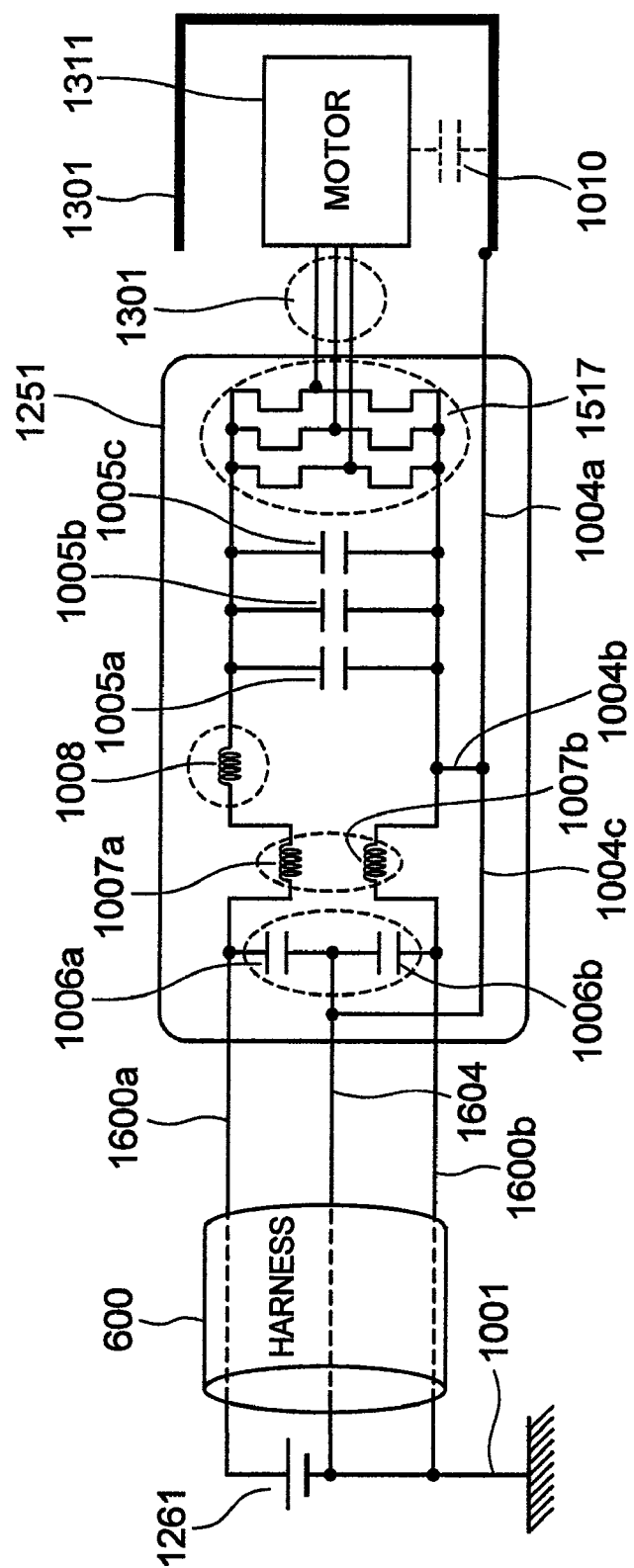
FIG. 1 is a circuit configuration diagram of an electric braking apparatus in FIG. 2.

FIG. 1 is a circuit configuration diagram of the electric braking apparatus in FIG. 2.

The battery 1261 supplies power to the electric braking apparatus and other electric components carried on the car. As shown in FIG. 4, the lower level control circuit 1599 processes a requested thrust command signal transmitted from the host control circuit 1299 arranged on the car side and output signals of the sensors incorporated in the electric braking apparatus as well and outputs a PWM signal to the three-phase motor pre-driver 1531 so that the electric braking apparatus may generate a thrust force complying with the requested thrust command. The three-phase motor pre-driver 1531 changes the voltage level of the PWM signal from the lower level control circuit 1599 and delivers a resulting output to the three-phase motor inverter 1517. Responsive to the PWM signal from the three-phase motor pre-driver 1531, the three-phase motor inverter 1517 switches incorporated transistors so as to control the voltage applied to the motor 1311, thus controlling conduction current to the motor 1311. The motor 1311 generates rotational torque in accordance with the conduction current.

Noise radiated from the electric circuit unit 1251 as above mainly includes noise due to changes in the magnetic field and electric field in the motor and noise due to switching at the time of on/off operation of transistors in the three-phase motor inverter 1517. In addition, the PWM signal delivered out of the lower level control circuit 1599 and the PWM signal delivered out of the three-phase motor pre-driver 1531 also generate noise. Further, a clock signal for operating the CPU arranged on the control substrate and a CPU drive monitoring signal delivered out of the lower level control circuit 1599 also generate noise.

The noise generated by the electrical equipments mounted on the car is transmitted to the electric braking apparatus and other electrical equipments through the power lines. Further, in some applications, an alternating power source is used as a backup power source for the electric braking apparatus and in this case, noise generated by alternating current will migrate to the electric braking apparatus through the medium of the power source lines.

A common mode coil 1007a in FIG. 1 is packaged between the plus side of battery 1261 and the three-phase motor inverter 1517 in the control circuit unit and a common mode coil 1007b is packaged between the three-phase motor inverter 1517 and the minus side of battery 1261.

The common mode coils 1007a and 1007b eliminate the noise the electronic components generate so as to prevent migration of the noise to the electric circuit unit 1251 and besides, to prevent intrusion of noise generated in the electric braking apparatus to the car frame side. A normal mode coil 1008 is packaged in the stage succeeding the common mode coil 1007a to reduce noise of frequency characteristics which cannot be reduced by the common mode coils 1007a and 1007b. Through this, erroneous operation of control circuits in the electric circuit unit can be prevented.

The common coils 1007a and 1007b have each specified characteristics which are so selected as to be tuned to a frequency of noise having an influence upon other apparatus.

A common mode capacitor 1006a leads noise conducted by the power line 1600a down to the ground line 1600b. A common mode capacitor 1006b leads noise irradiating on the shield member 1604 down to the ground line 1600b.

The capacitances of common mode capacitors 1006a and 1006b are determined by deriving noise frequencies to be reduced through simulation or measurement.

Noise generated in the motor 1311 is escaped to the metal housing 1301 through a stray capacitance component 1010 developing between the motor 1311 and the metal housing 1301. If the housing 1301 is not grounded, noise will radiate from the housing 1301.

Then, a ground intensifying line 1004c connects the housing 1301 to the shield member 1604 through a ground intensifying line 1004a. This expedient is effective to eliminate a discontinuous point or surface between the housing 1301 and the electric circuit unit 1251 to thereby stabilize potential and consequently, noise radiation can be reduced.

To describe more specifically, the noise irradiating on the housing 1301 is led down to the shielding member 1604 via the ground intensifying lines 1004a and 1004c and then led down to the battery ground 1001 via the common mode capacitor 1006b. In this manner, the intrusion of noise to the interior of the electric braking apparatus and the radiation of noise to the outside can be prevented.

With the ground intensifying line 1004c connected to the shielding member 1604, the noise is led down to the battery ground 1001 via the shielding member 1604. At that time, a ground intensifying line 1004b is connected between the ground intensifying line 1004a and a connecting point of the common mode coil 1007a and the three-phase motor inverter 1517.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electric braking apparatus mounted in association with wheels of a vehicle, comprising:
    brake pads for pressing disk rotors rotating along with the wheels;
    an electric motor for generating rotational torque;
    a rotation/linear motion conversion mechanism for converting a force pressed on said braking pads;
    a metal housing for housing at least said electric motor;
    an inverter for converting DC current from a power source arranged on said vehicle to AC current used to drive said electric motor;
    a positive-polarity power supply line for transmitting the DC current from said power source to said inverter;
    a negative-polarity power supply line for connecting said inverter to the ground of said vehicle;
    a plurality of capacitors connected between said positive-polarity and negative-polarity power supply lines; and
    a first conductor for electrically connecting said metal housing to one of said plural capacitors.

2. An electric braking apparatus according to claim 1 further comprising:
    noise elimination means for eliminating noise conducting on said positive-polarity and negative-polarity power supply lines by cooperative action of a first inductance element connected to said positive-polarity power supply line with a second inductance element connected to said negative-polarity power supply line; and
    a second conductor for electrically connecting said negative-polarity power supply line interposed between said noise elimination means and said electric motor to said metal housing.

3. An electric braking apparatus according to claim 2, wherein said first and second conductors branch from a single conductor connected to said metal housing.

4. An electric braking apparatus according to claim 1 further comprising:
    a housing for control circuit unit which houses at least said inverter, said positive-polarity and negative-polarity power supply lines and said plural capacitors;
    a power source line connected to said positive-polarity power supply line;
    a ground line connected to said negative-polarity power supply line;
    a shield film covering at least one of said power source line and said ground line and electrically connected to any one of said plural capacitors; and
    a harness having an outer cover for covering said shield film and electrically connected to units arranged in the car frame, said first conductor being connected to said shield film.

5. An apparatus for electric braking including an inverter for converting DC current from a power source arranged on an vehicle to AC current used to drive an electric motor housed in a metal housing, comprising:
    a positive-polarity power supply line for transmitting the DC current from said power source to said inverter;
    a negative-polarity power supply line for connecting said inverter to the ground of said vehicle;
    a plurality of capacitors connected between said positive-polarity and negative-polarity power supply lines; and
    a first conductor for electrically connecting said metal housing to one of said plural capacitors.

6. The apparatus according to claim 5 further comprising;
    noise elimination means for eliminating noise conducting on said positive-polarity and negative-polarity power supply lines by cooperative action of a first inductance element connected to said positive-polarity power supply line with a second inductance element connected to said negative-polarity power supply line; and
    a second conductor for electrically connecting said negative-polarity power supply line interposed between said noise elimination means and said electric motor to said metal housing.

7. The apparatus according to claim 6, wherein said first and second conductors branch from a single conductor connected to said metal housing.

8. The apparatus according to claim 5 further comprising:
    a housing for control circuit unit which houses at least said inverter, said positive-polarity and negative-polarity power supply lines and said plural capacitors;
    a power source line connected to said positive-polarity power supply line;
    a ground line connected to said negative-polarity power supply line;
    a shield film covering at least one of said power source line and said ground line and electrically connected to any one of said plural capacitors; and
    a harness having an outer cover for covering said shield film and electrically connected to units arranged in the car frame, said first conductor being connected to said shield film.

* * * * *